(12) United States Patent
Reed et al.

(10) Patent No.: US 9,866,389 B2
(45) Date of Patent: Jan. 9, 2018

(54) MULTI-BROADCAST BEACON SIGNALS

(71) Applicant: Footmarks, Inc., Bellevue, WA (US)

(72) Inventors: Ryan Preston Reed, Issaquah, WA (US); Casey Roger Graika, Bellevue, WA (US)

(73) Assignee: FOOTMARKS, INC., Bellevue, WA (US)

( * ) Notice: Subject to any disclaimer, the term of this patent is extended or adjusted under 35 U.S.C. 154(b) by 381 days.

(21) Appl. No.: 14/603,270

(22) Filed: Jan. 22, 2015

(65) Prior Publication Data

US 2015/0215781 A1 Jul. 30, 2015

Related U.S. Application Data

(60) Provisional application No. 61/931,041, filed on Jan. 24, 2014.

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *H04L 9/32* | (2006.01) |

(Continued)

(52) U.S. Cl.
CPC .......... *H04L 9/3236* (2013.01); *H04L 63/126* (2013.01); *H04W 12/10* (2013.01); *H04W 12/12* (2013.01); *H04L 2209/80* (2013.01); *H04W 48/12* (2013.01)

(58) Field of Classification Search
CPC ..... H04W 12/00; H04W 12/08; H04W 12/10; H04W 48/08; H04W 48/10; H04L 63/08; H04L 63/12–63/166; H04L 9/32; H04L 61/6081; H04H 60/88; H04H 60/90–60/92
See application file for complete search history.

(56) References Cited

U.S. PATENT DOCUMENTS

| | | | |
|---|---|---|---|
| 7,706,404 | B2 | 4/2010 | Fleming |
| 7,814,212 | B1 | 10/2010 | Chan |

(Continued)

OTHER PUBLICATIONS

Portnoi, et al., "Loc-Auth: Location-Enabled Authentication Through Attribute-Based Encryption," http://arxiv.org/abs/1410.0983, dated Nov. 17, 2014, 5 pages.

(Continued)

*Primary Examiner* — Daniel Potratz
(74) *Attorney, Agent, or Firm* — Lee & Hayes, PLLC

(57) ABSTRACT

Disclosed herein are techniques and systems for transmitting a multi-broadcast signal from a wireless broadcasting device (or beacon) as part of a beacon recognition process. Specifically, the multi-broadcast signal may be in the form of multiple packets that are broadcast from the beacon within a recognition time period. A process may include creating a first packet having a first identifier (ID) and a randomly generated value, broadcasting the first packet from the beacon, generating a second ID based at least in part on the randomly generated value included in the first packet, and broadcasting, within a period of time from the broadcast of the first packet, a second packet having the second ID and a device ID that uniquely identifies the beacon. A mobile device in proximity to the beacon may include logic to detect and interpret a multi-broadcast signal from the beacon.

20 Claims, 7 Drawing Sheets

(51) Int. Cl.
   *H04W 12/12* (2009.01)
   *H04W 12/10* (2009.01)
   *H04W 48/12* (2009.01)

(56) References Cited

U.S. PATENT DOCUMENTS

| | | |
|---|---|---|
| 8,396,485 B2 | 3/2013 | Grainger et al. |
| 8,711,751 B2 | 4/2014 | Mueck et al. |
| 8,810,430 B2 | 8/2014 | Proud |
| 8,824,677 B1* | 9/2014 | Ramzan ................ H04L 9/0869 380/268 |
| 8,847,754 B2 | 9/2014 | Buchheim et al. |
| 9,544,075 B2* | 1/2017 | Altman ................... H04H 60/90 |
| 2002/0081972 A1 | 6/2002 | Rankin |
| 2005/0027984 A1 | 2/2005 | Saito et al. |
| 2005/0048971 A1* | 3/2005 | Findikli ................ G06F 21/10 455/435.1 |
| 2008/0080492 A1 | 4/2008 | Pyeon et al. |
| 2011/0035589 A1 | 2/2011 | Butcher et al. |
| 2012/0011219 A1* | 1/2012 | Zhang ...................... G06F 8/61 709/217 |
| 2013/0065584 A1 | 3/2013 | Lyon et al. |
| 2013/0217332 A1* | 8/2013 | Altman ................... H04H 60/90 455/41.2 |
| 2013/0217333 A1 | 8/2013 | Sprigg et al. |
| 2013/0282438 A1* | 10/2013 | Hunter ...................... G01S 1/02 705/7.32 |
| 2014/0040139 A1 | 2/2014 | Brudnicki et al. |
| 2014/0133656 A1* | 5/2014 | Wurster ................ H04L 9/0637 380/270 |
| 2014/0160978 A1 | 6/2014 | Palin et al. |
| 2014/0223160 A1* | 8/2014 | Kim .......................... G06F 8/65 713/2 |
| 2014/0254466 A1 | 9/2014 | Wurster et al. |

OTHER PUBLICATIONS

Vlugt, et al., "Bluetooth Low Energy, Beacons and Retail," http://global.verifone.com/media/3603729/bluetooth-low-energy-beacons-retail-wp.pdf, dated Oct. 23, 2013, 12 pages.

PCT Search Report and Written Opnion dated Jun. 11, 2015 for PCT application No. PCT/US2015/012516, 6 pages.

\* cited by examiner

MULTI-BROADCAST BEACON SIGNALS

RELATED APPLICATIONS

This U.S. patent application claims priority to provisional U.S. patent application No. 61/931,041, entitled "PRIVATE BEACON NETWORK," and filed on Jan. 24, 2014, the entirety of which is incorporated herein by reference.

BACKGROUND

Short range wireless communication protocols, such as Bluetooth®, allow mobile computing devices to communicate wirelessly with other nearby devices over relatively short distances, without having to route the communication through a network of remote devices, such as satellites and cell towers. Such wireless communication protocols have advanced in recent years through the development of various technologies, such as low energy technology. Low energy wireless communication protocols reduce the operating power requirements for wireless devices that implement the protocols. Bluetooth® Low Energy (BLE, or Bluetooth® Smart) is one example of such a low energy wireless communication protocol.

Beacons that are powered by a low energy wireless communication protocol, such as BLE, have been implemented in various scenarios to enable a diverse range of functionality, such as location-based services, mobile couponing, mobile payments, and so on. Beacons can be used to broadcast data to mobile devices (e.g., smart phones) that are within a transmission range of the beacon so that the mobile devices can provide contextual information to associated users. For example, when a mobile device is near a beacon that is situated in a retail store, the beacon's broadcast can be used to provide contextual information (e.g., coupons for nearby products) to a user via the mobile device. Beacons enable this functionality by broadcasting a radio signal with a sequence of unique identifiers (IDs) that can be associated with metadata, such as, store locations, departments within a store, product information, or the like.

However, at least with BLE protocol, radio broadcasts are generally not secure because unauthorized third parties are able to write code to harvest the unique IDs from the radio broadcast and use the associated metadata to apply context for illicit purposes, such as to engage a user via a mobile application with third party competitive content when the user is in proximity of the beacon. For BLE beacons, the unauthorized company need only harvest the universally unique identifier (UUID) and either the "Major" and "Minor" values or the media access control (MAC) address that are included in the radio broadcast in order to discover where the beacon is located and any associated context (e.g., information that the beacon is located within a specific department of a particular company's store). Thus, beacon broadcasts that operate using standard wireless communication protocols remain vulnerable to hackers.

SUMMARY

Described herein are techniques and systems for transmitting a multi-broadcast signal from a wireless broadcasting device (referred to herein as a "beacon") as part of a beacon recognition process between the beacon and a mobile device in proximity to the beacon. Specifically, the multi-broadcast signal may be in the form of multiple packets that are broadcast from the beacon within a time period that is suitable for allowing any proximate mobile device to recognize the beacon through one or more identifiers (IDs) that are included in each packet of the multi-broadcast signal. The multi-broadcast signal provides for a secure and private broadcast from the beacon in order to prevent unauthorized third parties from detecting and/or making sense of the broadcast signals. That is, unauthorized third parties are unable to associate the metadata or context from the identifiers in the broadcast packets.

In some embodiments, a wireless broadcasting device (beacon) may include instructions for execution by one or more processors of the wireless broadcasting device, the instructions, upon execution, causing creation of a first packet having a first identifier (ID) and a randomly generated value, and further causing a broadcast of the first packet from the wireless broadcasting device. The instructions, upon execution, further cause generating a second ID based at least in part on the randomly generated value included in the first packet, the second ID to be included in a second packet along with a device ID that uniquely identifies the wireless broadcasting device. The wireless broadcasting device may then broadcast the second packet within a period of time from the broadcast of the first packet.

In some embodiments, a mobile computing device includes instructions stored in memory of the mobile computing device that are configured to receive, when the mobile device is brought within proximity of the wireless broadcasting device (i.e., within a transmission range of the wireless broadcasting device), the multi-broadcast signal from the wireless broadcasting device and to process the multi-broadcast signal. In particular, the mobile device may scan for a first ID, and may receive a first packet having the first ID. Upon receipt of the first packet, the mobile device may extract a randomly generated value from the first packet, and may perform a cryptographic operation using the extracted randomly generated value to determine a second ID. The mobile computing device may then scan for the second ID, and may receive a second packet having the second ID. Upon receipt of the second packet, the mobile device may extract a device ID from the second packet that uniquely identifies the wireless broadcasting device that broadcasted the first and second packets in the multi-broadcast signal.

In some embodiments, the randomly generated value included in the first packet that is broadcast by the wireless broadcasting device may be used as a seed for a hashing algorithm to create the second ID that is to be included in the second packet. By updating this randomly generated value (i.e., regenerating a new random value) and including the new randomly generated value in subsequently broadcasted packets, the randomly generated value can be utilized as a "rotating key" that, upon receipt at a mobile device, tells the mobile device how to scan for, receive, and interpret the second broadcast.

Also disclosed herein are techniques for authenticating write commands at a beacon, the write commands to modify a characteristic of the beacon. In this manner, a secure protocol may be implemented to prevent unauthorized writes to the beacon and to ensure that unauthorized parties do not have the ability to change the characteristics of the beacon.

The techniques and systems disclosed herein may be utilized for various messaging purposes including, among other things, improving the security of wireless signals that are broadcasted from beacons. For instance, the multi-broadcast nature of the signal disclosed herein is difficult to circumvent, thereby preventing unauthorized third parties from making sense of the signals broadcasted from the beacon. From an unauthorized entity's perspective, each broadcasted packet is seen as a new beacon broadcast. Without the appropriate logic to interpret the multi-broadcast signal, the unauthorized third party cannot detect the randomly generated second ID that is broadcasted in the second packet. Without being able to detect and interpret the second ID in the second packet, the unauthorized third party is thereby unable to associate context and metadata with the beacon, and is, in turn, unable to engage users for illicit purposes. The techniques disclosed herein become more robust as beacon networks scale to larger sizes. That is, the more beacons that are implemented in a given environment, the more difficult it is to circumvent the techniques disclosed herein.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques and systems for transmitting a multi-broadcast signal from a wireless broadcasting device (referred to herein as a beacon) as part of a device recognition process between the beacon and a mobile computing device that is within transmission range of the beacon. Although the techniques and systems disclosed herein are predominantly described with respect to implementation using BLE protocol, this disclosure is not limited to using BLE protocol, as other wireless communication protocols may benefit from the techniques and systems disclosed herein, such as ZigBee, WiFi, and other similar wireless communication protocols.

Moreover, the techniques and systems disclosed herein are not limited to security applications, as other messaging benefits may be realized using the multi-broadcast technique described herein. For example, the multi-broadcast techniques disclosed herein may be utilized for power saving purposes. That is, a mobile computing device may be configured to scan for the first ID using a low power scanning mode until a first packet having a first ID is received, and then the mobile computing device may thereafter scan for a second ID derived from a randomly generated value extracted from the first packet, wherein the scanning for the second ID uses a higher power scanning mode. In this manner, the default scanning operation (i.e., scanning for the first ID) saves the battery on the mobile device until the mobile device knows that a second packet having the second ID is available for reception.

Example Environment

Figure 1:
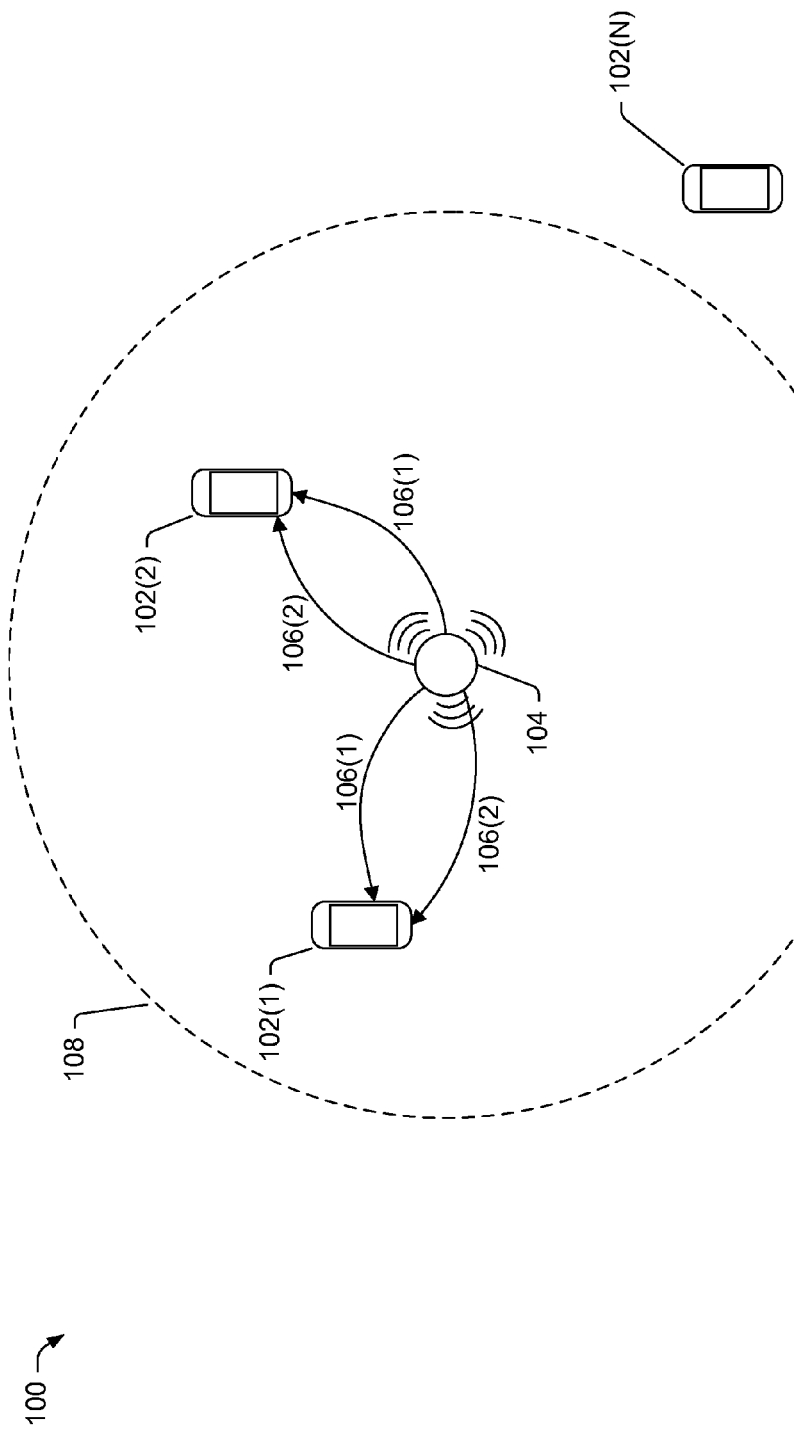
FIG. 1 illustrates an example environment including example mobile computing devices and an example wireless broadcasting device (or beacon) that is configured to transmit a multi-broadcast signal.

FIG. 1 illustrates an example environment 100 including a plurality of example mobile computing devices 102(1), 102(2), . . . , 102(N) (collectively 102) and an example wireless broadcasting device 104 (sometimes referred to herein as a "beacon 104"). The beacon 104 may be configured to broadcast multiple packets 106(1) and 106(2) (collectively 106) as part of a recognition process. The undirected broadcast of the packets 106 may be available for reception by individual ones of the mobile computing devices 102 that are within a transmission range 108 of the beacon 104. The beacon 104 may operate using any suitable wireless communication protocol, including a low energy protocol. One example low energy wireless protocol that is suitable for implementation with the embodiments disclosed herein is the BLE protocol.

The multiple packets 106 that are broadcast in the multi-broadcast signal may include a first packet 106(1) and a second packet 106(2) that are broadcast within a time period for beacon recognition. In some embodiments, the time period that the first and second packets 106(1) and 106(2) are broadcast within is within a range of about 20 milliseconds to about 10.5 seconds. The first packet 106(1) and the second packet 106(2) may be broadcast simultaneously, or they may be broadcast in sequence. Furthermore, the beacon 104 may re-broadcast the packets 106(1) and 106(2) at some predetermined frequency within the time period for beacon recognition. In this manner, the beacon 104 may be configured to continuously broadcast the multiple packets 106(1) and 106(2) such that when a mobile device 102(1) eventually moves within the transmission range 108 of the beacon 104 partway through a broadcast interval, the mobile device 102(1) can scan for a first ID and receive the first packet 106(1). In some embodiments, the beacon 104 may comprise both a transmitting device and a receiving device (i.e., a transceiver) such that data can be transmitted from the beacon 104 to a mobile device 102 or data from a mobile devices 102 can be received by the beacon 104 (e.g., write commands for changing beacon characteristics).

BLE is an exemplary wireless communication protocol that can be used to transmit messages between the beacon 104 and one or more of the mobile devices 102. The BLE specification ("BLE Specification") is defined in Volume 6 of the Bluetooth Specification. Version 4.2 of the Bluetooth Specification was adopted on Dec. 2, 2014. According to the BLE Specification, the BLE system uses short wavelength radio transmissions in the 2.4 gigahertz (GHz) Industrial, Scientific, and Medical (ISM) band at 2400-2483.5 megahertz (MHz) and uses 40 radio frequency (RF) channels that are 2 MHz wide. BLE can use a radio technology called frequency-hopping spread spectrum which chops up the data being sent and transmits chunks of it on the different channels. BLE transmission can have a variable range, such as about 50 meters, an over-the-air data rate of about 1 megabit per second (Mb/s), and a power consumption that is a fraction of the power consumption of Classic Bluetooth.

BLE describes the operation of the link layer in terms of a state machine comprising multiple link layer states, including an advertising state, and a scanning state. The link layer in the advertising state can transmit advertising channel packets and can optionally listen to and respond to responses triggered by these advertising channel packets. A BLE device in the advertising state is known as an advertiser. The link layer in the scanning state can listen for advertising channel packets from devices that are advertising. A device in the scanning state is known as the scanner. In FIG. 1, the beacon 104 may represent an advertiser and each of the mobile devices 102 may represent a scanner. The first packet 106(1) and the second packet 106(2) may, in some embodiments, represent advertising channel packets when BLE protocol is utilized for the wireless communication between the beacon 104 and a mobile device 102.

Figure 2:
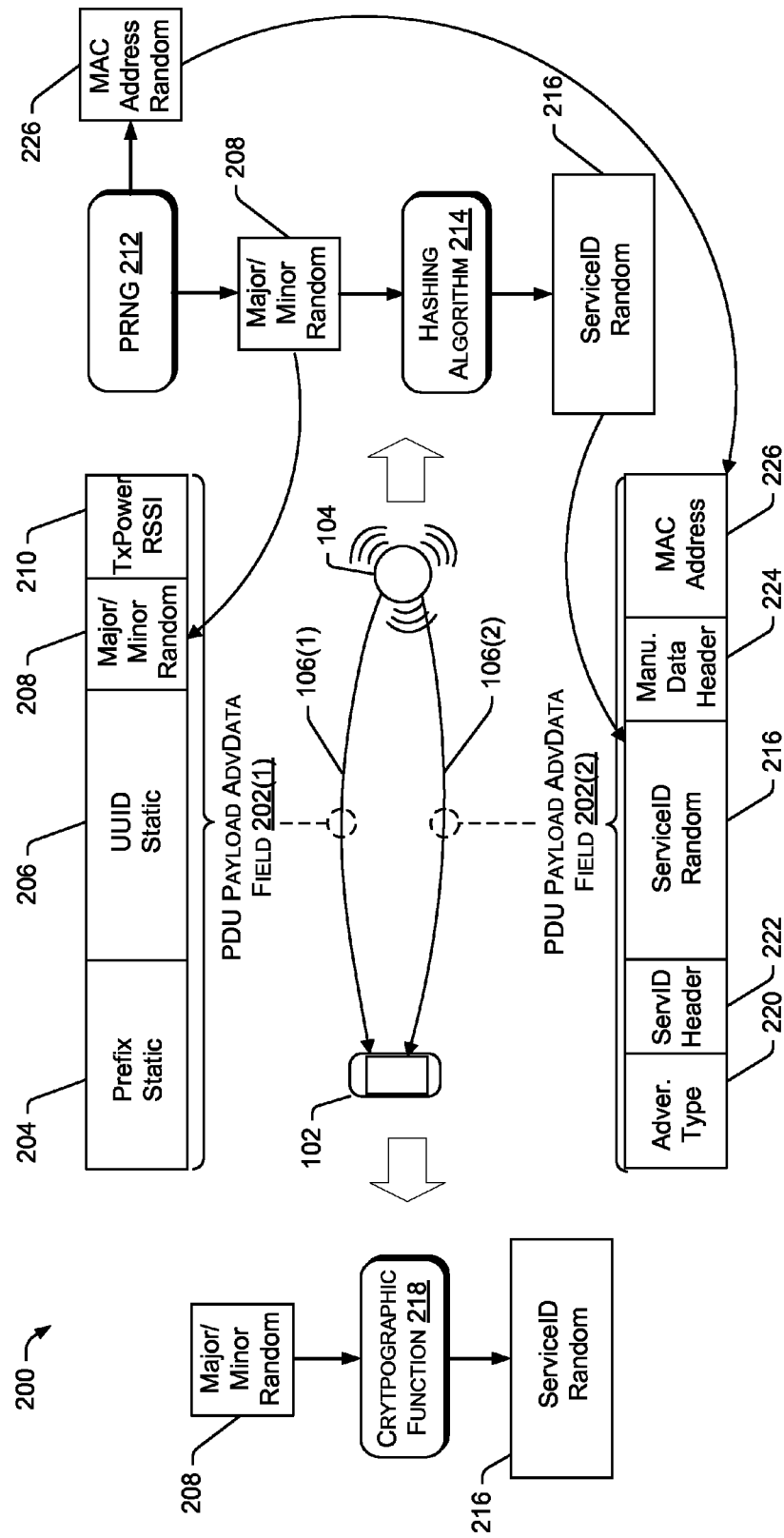
FIG. 2 illustrates a diagram of an example multi-broadcast technique as implemented between a wireless broadcasting device and a mobile computing device.

FIG. 2 illustrates a diagram 200 of an example multi-broadcast technique as implemented between a wireless broadcasting device 104 (beacon 104) and a mobile computing device 102. FIG. 2 shows the beacon 104 in wireless communication with the mobile device 102 using a wireless communication protocol, such as BLE. In BLE protocol, the BLE link layer has only one packet format used for both advertising channel packets and data channel packets. The packet format consists of four fields: a preamble, an access address, a protocol data unit (PDU), and a cyclic redundancy check (CRC). When a packet is transmitted in an advertising physical channel, the PDU is called the "advertising channel PDU," and when a packet is transmitted in a data physical channel, the PDU is called the "data channel PDU."

The advertising channel PDU has a 16-bit header and a variable size payload. The variable size payload of the advertising channel PDU includes a first field called the "AdvA" field that contains the advertiser's public or random device address, and a second field of variable size called the "AdvData" field that may contain advertising data. Referring again to FIG. 2, a representative example format of the "AdvData" field 202(1) of an advertising channel PDU payload of the first packet 106(1) is shown. In this sense, the AdvData field 202(1) may be transmitted or broadcast by the beacon 104 as part of the first packet 106(1) that was introduced in FIG. 1, such as part of an advertising channel packet in BLE protocol.

As noted above, the AdvData field 202(1) may be of any size within a range of 0 to 31 octets or bytes. Future versions of the BLE Specification may provide additional available bytes in advertisement packet structures (e.g., more available bytes in the PDU payload) such that the size of the first packet 106(1), the PDU payload, and/or the AdvData field 202(1) is not limited to the byte ranges/values specified herein. The example AdvData field 202(1) shown in FIG. 2 includes a prefix 204 (or "advertisement prefix 204"). The prefix 204 may be of any suitable size, such as 9 bytes, and the prefix 204 may be "static," meaning that it does not change. The AdvData field 202(1) may further include a first identifier (ID) 206 that may be in the form of a universally unique identifier (UUID) that is about 16 bytes. The first ID 206 may also be a static value. The AdvData field 202(1) may further include and a randomly generated value 208 that may comprise two portions, a major portion that is 2 bytes, and a minor portion that is 2 bytes, making for a randomly generated value 208 of 4 bytes, according to some embodiments. The AdvData field 202(1) may further include a transmitter power (TxPower) value of about 1 byte and received signal strength indicator (RSSI) value of about 1 byte (together referenced by numeral 210 in FIG. 2).

It is to be recognized that the format of the AdvData field 202(1) is not limited to the format shown in FIG. 2, as individual ones of the portions 204-210 may be omitted, and/or additional bits may be included in the AdvData field 202(1). Thus, the packet structure of the first packet 106(1) may be any suitable structure or format according to various implementations that are contemplated. In this sense, individual ones of the portions 204-210 may be placed in any suitable location within the first packet 106(1), and the first packet 106(1) may itself have any suitable format or structure. Likewise, the AdvData field 202(1) that is constituted of the portions 204-210 may be placed in any location within the first packet 106(1) without changing the basic characteristics of the system disclosed herein. In other words, the first ID 206 and/or the randomly generated value 208, among other portions of the packet, may be placed in any suitable location within the first packet 106(1), including locations other than the PDU payload of an advertising channel packet.

In order to create the first packet 106(1) (e.g., an advertising channel packet), the beacon 104 may include firmware having a pseudorandom number generator (PRNG) 212 and an associated PRNG algorithm to randomly generate the value 208, such as random major and minor values. This randomly generated value 208 may be placed in the first packet 106(1), such as within the PDU payload of the first packet 106(1). In standard BLE protocol, the major and minor values are typically used for versioning and/or to allow mobile applications to associate broadcasts with context. The techniques and systems disclosed herein utilize the major and minor values in the BLE advertising channel packet for a "key" that, upon receipt at the mobile device 102, tells the mobile device 102 how to scan for, receive, and interpret the second packet 106(2). In other words, the randomly generated value 208 acts as a key to unlock identifying information contained in the second packet 106 (2). In some embodiments, the beacon 104 may periodically (e.g., at various and/or random different times) generate new random values 208, and include them within subsequently broadcast packets. In this sense, the non-static randomly generated value 208 may be modified periodically and used as a "rotating key."

The firmware of the beacon 104 may also include a hashing algorithm 214 that is configured to transform or convert the randomly generated value 208 into a random second ID 216, which is to be included in the second packet 106(2). In particular, the firmware of the beacon 104 is configured to use the randomly generated value 208 as a seed for the hashing algorithm 214 to create the second ID 216. The randomly generated second ID 216 may be in the form of a ServiceID (in BLE protocol) of about 16 bytes that the mobile device 102 can scan for in order to receive the second packet 106(2) and thereby associate metadata and context with the beacon 104. Again, future versions of the BLE Specification may provide additional available bytes in advertisement packet structures (e.g., more available bytes in the PDU payload) such that the size of the second packet 106(2), the PDU payload, and/or the second ID 216 is not limited to the byte ranges/values specified herein. In some embodiments, the process of generating the second ID 216 from the randomly generated value 208 includes using a cryptographic key (e.g., an Advanced Encryption Standard (AES) key) to encrypt the randomly generated value 208 that is repeated a number of times (e.g., four times) by the hashing algorithm 214, and stored in memory of the beacon 104 as the random second ID 216.

A properly configured mobile device 102 that is within the transmission range 108 of the beacon 104 may include a particular software development kit (SDK) or similar logic to detect and interpret the multiple different packets 106(1) and 106(2) of the multi-broadcast signal from the beacon 104. For example, the mobile device 102 may comprise logic to scan for the first ID 206 that is included in the first packet 106(1) so that, upon receipt of the first packet 106(1) having the first ID 206, the mobile device 102 can identify and extract the randomly generated value 208 from the first packet 106(1). Once the randomly generated value 208 has been extracted from the first packet 106(1), the mobile device 102 may utilize a cryptographic function 218 stored in memory of the mobile device 102 to decrypt the randomly generated value 208 and decipher or derive the second ID 216. The cryptographic function 218 may work from knowledge of the hashing algorithm 214 that the beacon 104 used to generate the second ID 216 from the randomly generated value 208. In other words, the cryptographic function 218 may know the hashing algorithm 214 used by the beacon 104, and may know a particular cryptographic key used to encrypt the second ID 216 (i.e., the hashed randomly generated value 208). If the mobile device 102 did not include the SDK or logic having the cryptographic function 218, the unauthorized mobile device 102 would not know how to make sense of the second packet 106(2), such that, upon the broadcast of the second packet 106(2), an unauthorized mobile device 102 would see the broadcast of the second packet 106(2) as a new and different beacon than the beacon 104, and would not be able to associate context and metadata with the beacon 104 as a consequence.

After deciphering the second ID 216, the mobile device 102 may then scan for the second ID 216 so that the mobile device 102 can detect and receive the second packet 106(2). FIG. 2 shows an example format of the "AdvData" field 202(2) of a PDU payload of the second packet 106(2), such as a second advertising channel packet broadcasted by the beacon 104 as part of the recognition process. The example of FIG. 2 shows the AdvData field 202(2) as including an "advertising type" portion 220 to indicate the packet type as being used for advertising in BLE. The advertising type portion 220 may be about 3 bytes in size. The AdvData field 202(2) may further include a serviceID header portion 222 of about 2 bytes, and the randomly generated second ID 216, which may be about 16 bytes, according to some embodiments. The AdvData field 202(2) may further include a manufacturer data header portion 224, and a device ID portion 226 that contains a device ID, such as a media access control (MAC) address, that uniquely identifies the wireless broadcasting device 104. The device ID portion 226 is the portion of the second packet 106(2) that the mobile device 102 extracts in order to associated metadata and context with the beacon 104.

It is to be recognized that the format of the AdvData field 202(2) is not limited to the format shown in FIG. 2, as individual ones of the portions 216 and 220-226 may be omitted, and/or additional bits may be included in the AdvData field 202(2). Thus, the packet structure of the second packet 106(2) may be any suitable structure or format according to various implementations that are contemplated. In this sense, individual ones of the portions 216 and 220-226 may be placed in any suitable location within the second packet 106(2), and the second packet 106(2) may itself have any suitable format or structure. Likewise, the AdvData field 202(2) that is constituted of the portions 216 and 220-226 may be placed in any location within the second packet 106(2) without changing the basic characteristics of the system disclosed herein. In other words, the random second ID 216 and/or the device ID 226, among other portions of the packet, may be placed in any suitable location within the second packet 106(2), including locations other than the PDU payload of an advertising channel packet.

In some embodiments, the beacon 104 may periodically (e.g., every few minutes) generate a random device ID 226 using the PRNG 212 and assign the randomly generated device ID 226 to the beacon 104. In this manner, the most up-to-date device ID 226 (i.e., a currently assigned device ID 226) may be included in the second packet 106(2) in order to obscure any device-identifying information from unauthorized devices that may detect the second packet 106(2) in a broadcast from the beacon 104. It is to be appreciated that, although FIG. 2 shows two packets 106(1) and 106(2) as constituting the multi-broadcast signal, any number of two or more packets 106 may be utilized in the multi-broadcast signal without changing the basic characteristics of the system. In other words, a chain of three or more packets 106 may be broadcast as part of the multi-broadcast technique without departing from the basic characteristics of the system.

Example Processes

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 3:
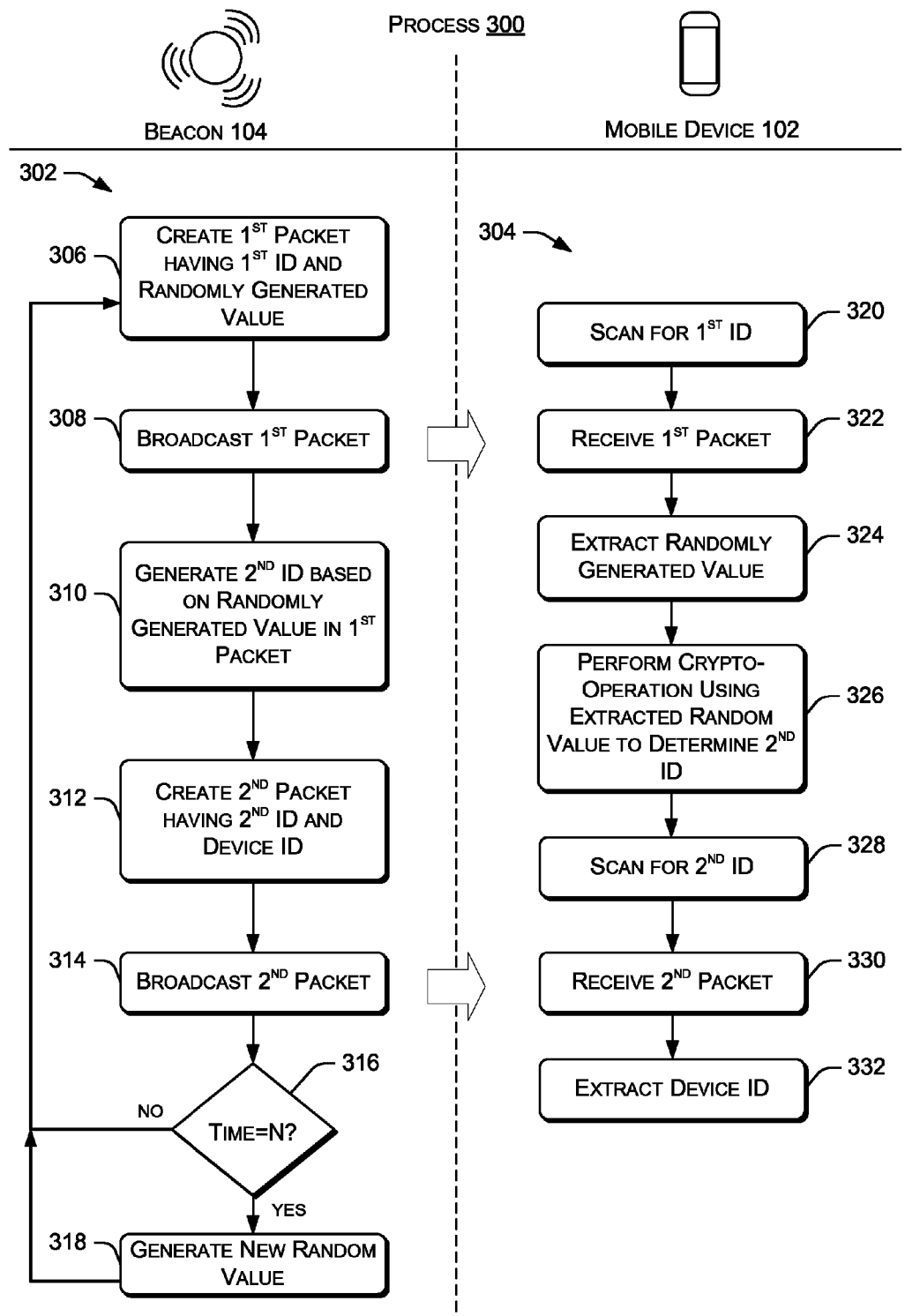
FIG. 3 illustrates a flowchart of an example recognition process between a wireless broadcasting device and a mobile computing device using an example multi-broadcast technique.

FIG. 3 illustrates a flowchart of an example recognition process 300 between a wireless broadcasting device 104 (beacon 104) and a mobile computing device 102 using an example multi-broadcast technique. The process 300 may be constituted of two independent sub-processes, a process 302 performed by the beacon 104 and a process 304 performed by the mobile device 102. Both are shown side-by-side to provide context of how the two sub-processes 302 and 304 interoperate during the recognition process 300. The process 300 may be implemented with any suitable wireless communication protocol, such as BLE.

Starting with the sub-process 302, at 306, the beacon 104 may create a first packet 106(1) that is to be broadcast as part of a recognition process for receipt by a mobile computing device 102 that is in proximity of the beacon 104 (i.e., within the transmission range 108) and that is configured to receive and process a multi-broadcast signal from the beacon 104. The first packet 106(1) that is created at 306 may include the first ID 206, such as a static UUID, and the randomly generated value 208, such as a 4 byte major/minor pair, which were introduced in FIG. 2. The randomly generated value 208 may be generated from a PRNG algorithm in firmware of the beacon 104 and placed in the first packet 106(1), such as within a non-static portion of an AdvData field 202(1) of a PDU payload of the first packet 106(1) (e.g., an advertising channel packet).

At 308, the beacon 104 may broadcast the first packet 106(1). The broadcast at 308 may be an "undirected" broadcast, meaning that a transmission is broadcast to no particular receiver, but can be received by any device within the transmission range 108 of the beacon 104. In this case, the mobile device 102 represents a computing device within the transmission range 108 of the beacon 104.

At 310, the beacon 104 may generate a second ID 216 based at least in part on the randomly generated value 208 that the beacon 104 included in the first packet 106(1). The generation at 310 of the random second ID 216 may include using the randomly generated value 208 as a seed for a hashing algorithm 214 to obtain a hashed value that is designated as the second ID 216. In some embodiments, the randomly generated value 208 is repeated a number of times and the resulting value is designated as the second ID 216. In some embodiments, the hashed value is encrypted using symmetric key cryptography (e.g., using an AES key). In one illustrative example, the randomly generated value 208 is a four byte major/minor value (i.e., a random two byte major value and a random two byte minor value), which is hashed by repeating the four byte major/minor value four times to obtain a random 16 byte value. In the illustrative example, the 16 byte value may be encrypted with an AES key to create the second ID 216 to be included in the second packet 106(2). An example of this hashing and encrypting technique is discussed in more detail below with reference to FIG. 4.

At 312, the beacon 104 may create the second packet 106(2) by placing the second ID 216 and a device ID 226 in the second packet 106(2). For instance, the second ID 216 may be placed in the AdvData field 202(2) of the PDU payload of the second packet 106(2). The device ID 226 may comprise a MAC address of the beacon 104. In some embodiments, a random device ID 226 is periodically generated by the PRNG 212 of the beacon 104 in order to obscure the identifying information of the beacon 104 from potential hackers. In this scenario, the currently assigned, randomly generated device ID 226 may be placed in the second packet 106(2) at step 312.

At 314, the beacon 104 may broadcast the second packet 106(2). The broadcast of the second packet 106(2) may be within a predetermined period of time from the broadcast of the first packet 106(1), such as a few milliseconds, a few seconds, and the like, such that a multi-broadcast signal comprised of the first and second packets 106(1) and 106(2) can be detected and processed by the mobile device 102 as part of a recognition process.

At 316, a determination may be made as to whether a predetermined time interval has expired or lapsed since a start time (the start time may coincide with the time at which the broadcast at 308 of the first packet 106(1) was performed). For example, the time since the broadcast of the first packet 106(1) may be compared to a predetermined time interval of "N" minutes (e.g., a few minutes) to decide whether or not to rotate the random value 208 in the first packet 106(1). If the time is still within the time interval (e.g., time<N), the beacon 104 may continue to transmit a multi-broadcast signal having the first and second packets 106(1) and 106(2) using the same randomly generated value 208 in the first packet 106(1) by iterating the process 302 directly from decision block 316 by following the "no" route. The process 302 may iterate directly from decision block 316 at any suitable frequency, such as every few seconds, every few milliseconds, etc.

If, on the other hand, the time interval has expired at 316, the process 302 may continue by following the "yes" route to 318 where the beacon 104 may use the PRNG 212 to generate a new random value 208. The process 302 may then return to step 306 where the new random value 208 is included in the first packet 106(1) of another broadcast. In the chain of events described herein, whenever the process 302 iterates back to 306, the next first packet 106(1) that is broadcast after the initial second packet 106(2) may be considered a "third" packet, and then next second packet 106(2) that is broadcast thereafter may be considered a "fourth" packet, and so on. The process 302 may allow the beacon 104 to continuously rotate the value of the randomly generated value 208 in the first packet 106(1) of any particular broadcast to implement a rotating key that is decipherable by a properly configured mobile device 102.

In some embodiments, the PRNG 212 may be used to generate a new random device ID 226 at step 318 in addition to the newly generated random value 208. In this manner, the device ID 226 of the beacon 104 may be rotated in a similar fashion to that of the rotation of the randomly generated value 208 in order to obscure the device-identifying information from hackers.

In the independent process 304 that may be performed by the mobile device 102 substantially contemporaneously with the process 302 at the beacon, at 320, the mobile device 102 may scan for the first ID 206, such as a static UUID. The scan performed at 320 may be a BLE service scan in instances where BLE protocol is utilized by the beacon 104 and the mobile device 102. At 322, the mobile device 102 may receive the first packet 106(1) having the first ID 206.

At 324, the mobile device 102 may use logic to extract the randomly generated value 208 from the first packet 106(1). The extraction at 324 may involve identifying the randomly generated value 208 in a particular portion of the first packet 106(1), such as the AdvData field 202(1) of the PDU payload of the first packet 106(1).

With the extracted random value 208 in hand, the mobile device 102 now has the key that will tell the mobile device 102 how to detect the second packet 102(1). In general, the manner in which the second ID 216 is generated by the beacon 104 at 310 is known to the mobile device 102 so that the mobile device 102 can successfully decipher the second ID 216 from the randomly generated value 208 in the same way. At 326, the mobile device 102 may use a cryptographic function 218 to decipher a second ID 216 from the randomly generated value 208 that was extracted at 324. In some embodiments, the derivation of the second ID 216 at step 326 may involve hashing the randomly generated value 208 using a predetermined hashing algorithm. For example, the randomly generated value 208 may be repeated a predetermined number of times to form the second ID 216. For a four byte random value 208, repeating the randomly generated value 208 exactly four times would result in a 16 byte value to be designated as the second ID 216. In some embodiments, the hashed value may be encrypted at 326, such as by using symmetric key cryptography (e.g., an AES key).

At 328, the mobile device 102 may scan for the second ID 216 that it deciphered at 326. At 330, the mobile device 102 may receive the second packet 106(2) having the second ID 216.

At 332, the mobile device 102 may execute logic to extract the device ID 226 from the second packet 106(2).

The extraction at 332 may include identifying the device ID 226 in a portion of the second packet 106(2), such as the AdvData field 202(2) of a PDU payload of the second packet 106(2).

The recognition process 300 may ensure that unauthorized third parties cannot make sense of the broadcast from a particular beacon 104. More specifically, an unauthorized mobile device 102 that does not have the proper SDK or similar logic to perform the sub-process 304 will not be able to associate valuable context and metadata with the beacon 104, thereby making the broadcast from the beacon 104 private and secure for consumption by only authorized devices.

Figure 4:
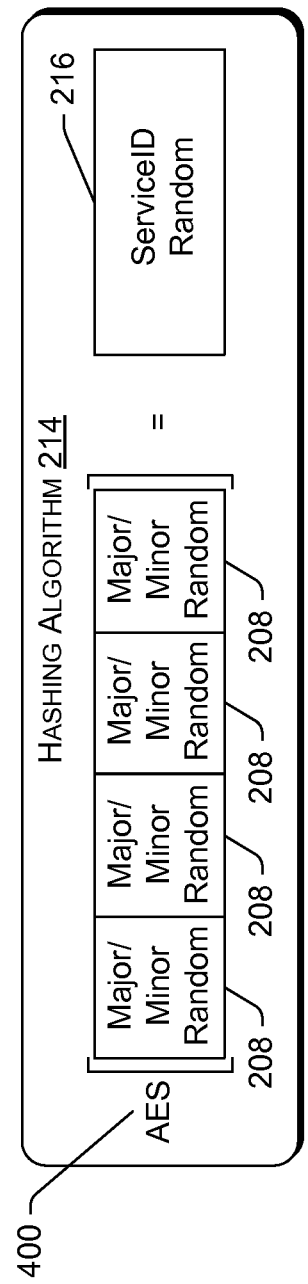
FIG. 4 illustrates an example hashing algorithm that is used to generate a random second ID from a randomly generated value.

FIG. 4 illustrates an example hashing algorithm 214 that may be used to generate a random second ID 216 from a randomly generated value 208 included in the first packet 106(1). The hashing algorithm 214 may be used by the beacon 104 to create the second ID 216, such as a UUID, to be included in the second packet 106(2) for detection by a properly configured mobile device 102. In FIG. 4, the randomly generated value 208, such as a two byte random major value and a two byte random minor value, may be repeated a predetermined number of times, such as four times, and that resultant value may be encrypted by a symmetric key 400, such as an AES key that is 128 bits. This hashing algorithm 214 results in the random second ID 216, such as a service ID. In some embodiments, the second ID 216 is 16 bytes in size.

Example System

Figure 5:
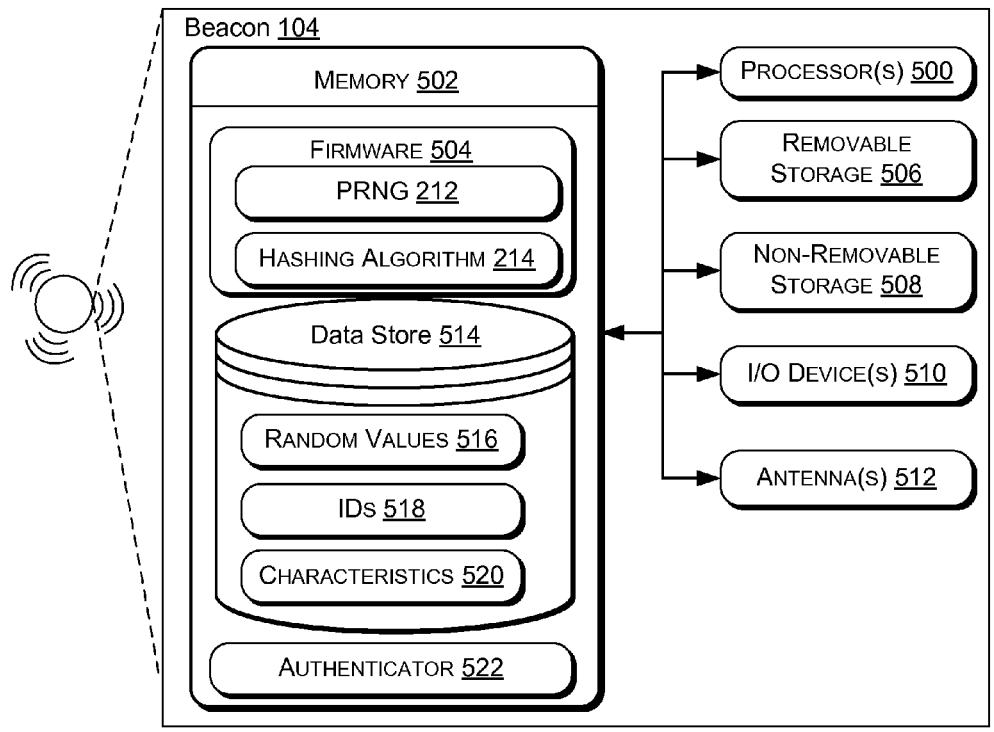
FIG. 5 is a block diagram of an example wireless broadcasting device (or beacon) in accordance with various embodiments.

FIG. 5 is a block diagram of an example wireless broadcasting device 104 (or beacon 104) in accordance with various embodiments. The beacon 104 may include one or more processors 500 and one or more forms of computer-readable memory 502. The one or more processors 500 may be implemented in hardware and/or software, and may include any suitable processor, controller, or the like that is configured to execute instructions stored in the memory 502 and/or firmware 504. In some embodiments, the one or more processors 500 may comprise a central processing unit(s), a microcontroller(s), an application specific integrated circuit (ASIC), a system on chip (SoC), or a similar integrated circuit (IC). The beacon 104 may also include additional storage devices. Such additional storage may include removable storage 506 and/or non-removable storage 508.

The beacon 104 may further include input and output devices 510. Input devices of the beacon 104 may include, without limitation, physical buttons (e.g., keyboard or keypad), a microphone, a touch screen, or any other suitable input device(s) coupled communicatively to the processor(s) 500 and the computer-readable memory 502. Output devices of the beacon 104 may include, without limitation, a display, speakers, a light emitting diode(s) (LED(s)), or any other suitable output device coupled communicatively to the processor(s) 500 and the computer-readable memory 502.

The beacon 104 may further include one or more antenna(s) 512 that allow the beacon 104 to wirelessly communicate with other computing devices, such as the mobile computing devices 102 shown in FIG. 1. The antenna(s) 512 may be a transceiver (i.e., a transmitter and receiver, capable of transmitting data and receiving data) facilitate communication using any suitable wireless communication protocol, such as low energy protocols (e.g., BLE). In this manner, the beacon 104 may broadcast the multiple packets 106 using the antenna(s) 512 over the transmission range 108 shown in FIG. 1.

Computer-readable media, as used herein, may include, at least, two types of computer-readable media, namely computer storage media and communication media. Computer storage media may include volatile and nonvolatile, removable and non-removable media implemented in any method or technology for storage of information, such as computer readable instructions, data structures, program modules, or other data. The memory 502, firmware 504, removable storage 506, and non-removable storage 508 are all examples of computer storage media. Computer storage media includes, but is not limited to, RAM, ROM, electrically erasable programmable read-only memory (EEPROM), flash memory or other memory technology, compact disk read-only memory (CD-ROM), digital versatile disks (DVD), or other optical storage, magnetic cassettes, magnetic tape, magnetic disk storage or other magnetic storage devices, or any other non-transmission medium that can be used to store the desired information and which can be accessed by the beacon 104. Any such computer storage media may be part of the beacon 104.

In some embodiments, any or all of the memory 502, firmware 504, removable storage 506, and non-removable storage 508 may store programming instructions, data structures, program modules and other data, which, when executed by the processor(s) 500, implement some or all of the processes described herein.

In contrast, communication media may embody computer-readable instructions, data structures, program modules, or other data in a modulated data signal, such as a carrier wave, or other transmission mechanism. As defined herein, computer storage media does not include communication media.

In some embodiments, the firmware 504 may include the PRNG 212 and associated algorithm(s) to generate random values for at least the randomly generated value 208 to be included in the first packet 106(1), and the device ID 226 to be included in the second packet 106(2). The PRNG 212 may utilize any suitable pseudo-random function or algorithm, such as a polynomial time computational function, or the like. The firmware 504 may further include the hashing algorithm 214 configured to generate the second ID 216 using the randomly generated value 208 as a seed for the hashing algorithm 214. In some embodiments, the hashing algorithm 214 may be configured to generate the second ID 216 according to the technique shown in FIG. 4.

The memory 502 may further include a data store 514 to store various information and data, such as various random values 516, various identifiers (IDs) 518, and one or more characteristics 520 of the beacon 104. The random values 516 may include, among other values, the randomly generated value 208 to be included in the first packet 106(1) and generated by the PRNG 212. The random values 516 may be periodically regenerated by the PRNG 212 and updated in the data store 514.

The IDs 518 may include the first ID 206 to be included in the first packet 106(1), the randomly generated second ID 216 to be included in the second packet 106(2), and the device ID 226 to be included in the second packet 106(2). In some embodiments, the device ID 226 may be randomly generated by the PRNG 212, and may include a MAC address of the beacon 104 that uniquely identifies the beacon 104.

The characteristics 520 of the beacon 104 may be stored as beacon attributes, such as the broadcast/transmission range 108 or transmitter power (TxPower) of the beacon 104, the broadcast (advertisement) frequency—which may comprise the time interval for broadcasting/re-broadcasting packets, such the multiple packets 106(1) and 106(2)—, battery life profile of the beacon 104 (i.e., specifications for how the beacon 104 operates to align with an estimated battery life), and so on. Some or all of the characteristics 520 may be readable and writable such that the a value(s) for each characteristic 520 may be stored in the data store 514 and may be updated upon a write command to change a characteristic 520 value to a new value. A write command to update one or more of the characteristics 520 of the beacon 104 may be issued from a mobile device 102 that is in proximity of the beacon 104, and that is properly configured with an SDK or appropriate logic to modify the characteristics 520 of the beacon 104.

Accordingly, the memory 502 may further include an authenticator 522 that is configured to authenticate write commands from other computing devices to the beacon 104, such as write commands received from a mobile device 102 to update one or more of the characteristics 520. The authenticator 522 may utilize a cryptographic key, such as a symmetric key of a symmetric key function (e.g., the AES key 400 of FIG. 4) to authenticate any write command message from a proximate mobile device 102 to ensure that the write command came from an authorized mobile device 102, as opposed to an unauthorized third party device. The authenticator 522 ensures that only authorized devices can modify the characteristics 520 of the beacon 104.

In one illustrative example, an authorized user of the beacon 104 (e.g., an entity that deployed the beacon 104 in the field, such as the beacon manufacturer) may utilize an online management console provided by a server (i.e., a cloud-based management console) to change the transmission range 108 of the beacon (an example characteristic 520) from say 20 feet to about 100 feet. The server may then instruct a properly configured mobile device 102 near the beacon 104 to write the modified characteristic 520 to the beacon's memory 502 using a secure protocol that can be authenticated by the authenticator 522. A process of authenticating such a message will be described in more detail below with respect to FIG. 7.

Figure 6:
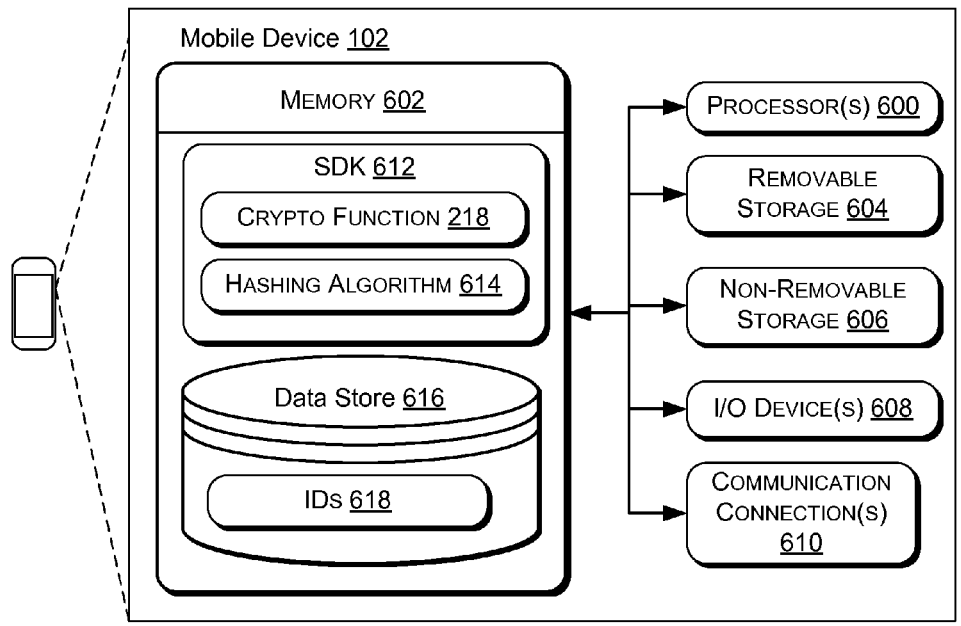
FIG. 6 is a block diagram of an example mobile computing device in accordance with various embodiments.

FIG. 6 is a block diagram of an example mobile device 102 that is configured to detect and process a multi-broadcast signal from a proximate beacon 104, and is further configured to write characteristics 520 to the beacon 104. The mobile device 102 may include one or more processors 600 and one or more forms of computer-readable memory 602. The one or more processors 600 and one or more forms of computer-readable memory 602 may include any of the above-described forms that were described in reference to the processor(s) 500 and memory 502 for the beacon 104. The mobile device 102 may also include additional storage devices. Such additional storage may include removable storage 604 and/or non-removable storage 606. The memory 602, the removable storage 604, and the non-removable storage 606 are all examples of computer storage media, as described above with reference to the storage media of the beacon 104.

The mobile device 102 may further include input and output devices 608. Input devices of the mobile device may include, without limitation, physical buttons (e.g., keyboard or keypad), a microphone, a touch screen, a pointer device (e.g., a stylus, pen, or similar input mechanism), or any other suitable input device(s) coupled communicatively to the processor(s) 600 and the computer-readable memory 602. Output devices of the mobile device 102 may include, without limitation, a display, speakers, a printer, tactile feedback mechanisms, or any other suitable output device coupled communicatively to the processor(s) 600 and the computer-readable memory 602.

The mobile device 102 may further include one or more communication connections 610 that allow the mobile device 102 to communicate with other computing devices, such as the beacon 104 shown in FIG. 1, or other computing devices over a network, such as the Internet. The communication connection(s) 610 may include one or more antenna(s) to facilitate communication using any suitable wireless communication protocol, such as low energy protocols like BLE. In this manner, the mobile device 102 may receive broadcasts from the beacon 104 and may transmit write commands and other messages back to the beacon 104.

In some embodiments, the mobile device 102 may include a software development kit (SDK) 612 or similar logic to detect and interpret the multiple packets 106(1) and 106(2) that are broadcasted from the beacon 104, and to write characteristics 520 to the beacon 104, among other things. The SDK 612 may be pre-installed on the mobile device 102 upon manufacture of the mobile device 102 or downloaded from remote source (e.g., server) over a network (e.g., the Internet), or a local source, such as a flash memory card, or the like.

The SDK 612 may include the cryptographic function 218 that may be utilized to derive or decipher the second ID 216 to scan for in the second packet 106(2). The cryptographic function 218 may be based on knowledge of the hashing algorithm 214 utilized by the beacon 104 firmware 504 to generate the second ID 216. In some embodiments, the SDK 612 of the mobile device 102 may further include a hashing algorithm 614 that can be utilized for, among other things, generating a hash of a characteristic 520 that is to be written to the beacon 104 in order to provide an authentic and verifiable write command to the beacon 104. In some embodiments, the hashing algorithm 614 may be configured to generate a hash of a characteristic 520 using the characteristic data as a seed for the hashing algorithm 614, which will be described in more detail below with reference to FIG. 8.

The memory 602 may further include a data store 616 to store various information and data, such as various identifiers (IDs) 618 which may correspond to, or match, one or more of the IDs 518 stored by the beacon 104. For example, the IDs 618 may include the first ID 206 to be included in the first packet 106(1) that the mobile device 102 is to initially scan for, the randomly generated second ID 216 to be included in the second packet 106(2) that the mobile device 102 is to scan for, and any device IDs 226 that the mobile device 102 extracts from the second packet 106(2) and with which the mobile device 102 can associate context and metadata with the beacon 104.

Figure 7:
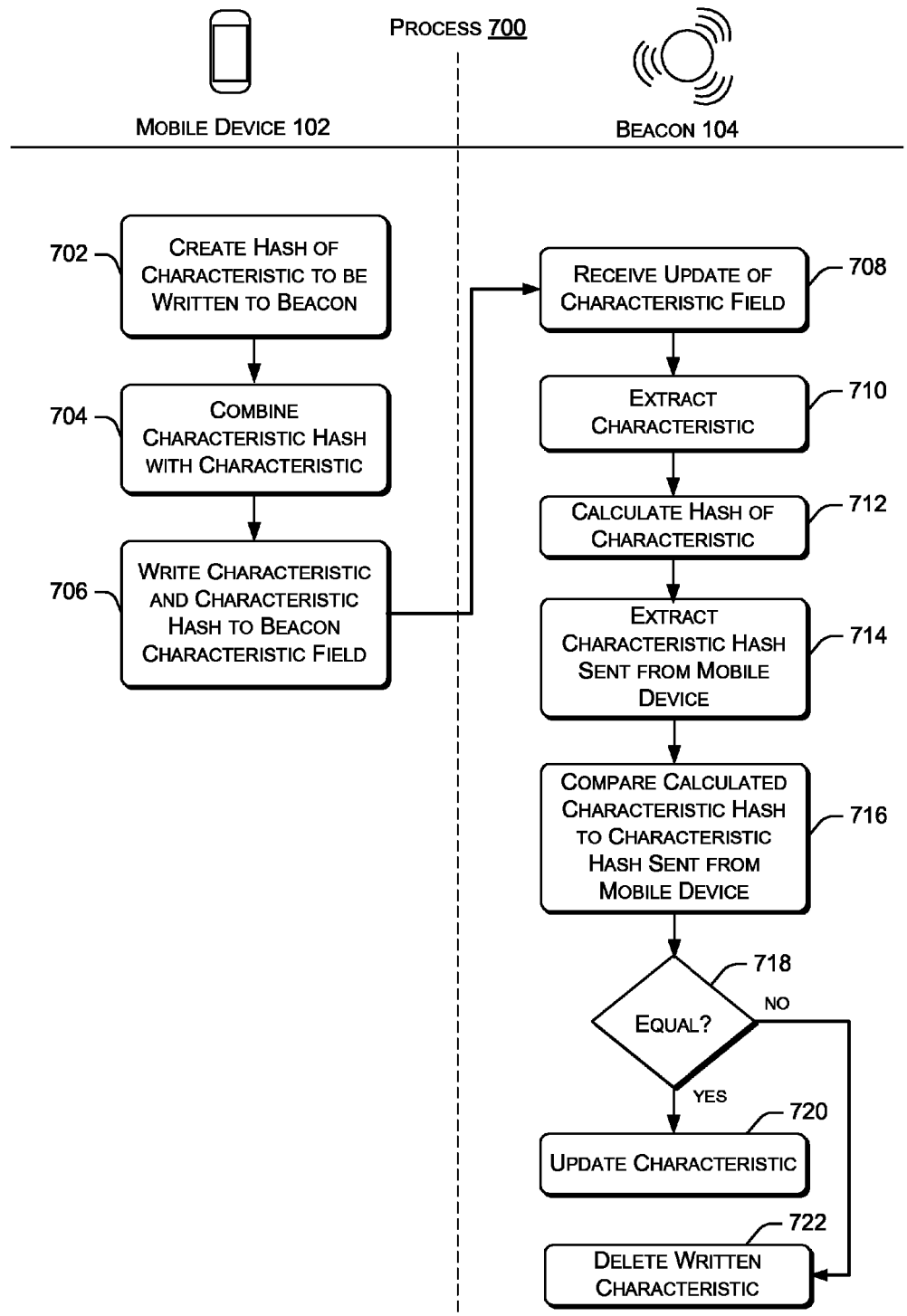
FIG. 7 illustrates a flowchart of an example process of authenticating written characteristics at a beacon.

FIG. 7 illustrates a flowchart of an example process 700 of authenticating written characteristics 520 at a beacon 104. The process 700 may be implemented to securely modify characteristics 520 at the beacon 104 and to prevent unauthorized third parties from changing the characteristics 520 of the beacon 104.

At 702, the mobile device 102 may utilize a hashing algorithm 614 to create a hash of a characteristic 520 that is to be written to the beacon 104. For example, the characteristic 520 to be written to the beacon 104 may be a new value for the transmission range 108 of the beacon or the TxPower of the beacon 104 to adjust how far the beacon 104 can broadcast messages from itself The characteristic data for this characteristic 520 may, in some embodiments, be repeated a predetermined number of times and encrypted with a symmetric key (e.g., the AES key 400) to create the characteristic hash at 702. In some embodiments, the characteristic hash may be 16 bytes in size.

At 704, the mobile device 704 may combine the characteristic hash created at 702 with the characteristic data to form a characteristic structure that can be sent to the beacon 104 for authentication thereon. In some embodiments, the characteristic data includes a pre-validation field of about one byte, and a characteristic data field of about 4 bytes to form the characteristic 520 of about 5 bytes.

At 706, the mobile device 102 may transmit a write command to the beacon 104 to write the combined characteristic 520 and the characteristic hash to the beacon's characteristic field. At 708, the beacon 104 may receive an update of its characteristic field. Continuing with the above example, the beacon 104 may receive, at 708, an update to its characteristic field for a new value of the transmission range 108.

At 710, the authenticator 522 of the beacon 104 may extract the characteristic 520 written to the characteristic field of the beacon, and at 712, the authenticator 522 may calculate a hash of the extracted characteristic. The calculation of the characteristic hash may be accomplished by the hashing algorithm 214 of the beacon 104 with knowledge of the hashing algorithm 614 utilized by the mobile device 102 SDK 612. In some embodiments, the beacon 104 may have the same AES key 400 as the mobile device 104 in order calculate the characteristic hash at 712 in a similar manner to that done by the mobile device 102 at 702 to create the characteristic hash.

In some embodiments, prior to the extraction at 710, the authenticator 522 may parse a pre-validation byte(s) of the characteristic data sent by the mobile device 102 in order to check the value of the pre-validation byte(s), and if equal to a predetermined value, the process 700 may proceed to step 710. If the pre-validation byte(s) is not equal to a predetermined value, the process 700 may terminate and the write command may be rejected without proceeding to the remaining steps of the process 700. This may save battery of the beacon 104 by allowing the beacon 104 to detect malicious characteristic writes that do not have the correct pre-validation byte(s).

At 714, the authenticator 522 may extract the characteristic hash that was sent from the mobile device 102 as part of the write command at 706. At 716, the characteristic hash that was calculated at 712 is compared to the characteristic hash that was extracted at 714 to see if the two characteristic hashes match at 718. If it is determined at 718 that the two characteristic hashes match, the authenticator 522 may designate the write command as authentic to verify the integrity of the write command sent from the mobile device 102, and the characteristic 520 may be updated (e.g., modified) at 720. If it is determined at 718 that the two characteristic hashes do not match, the authenticator 522 may designate the write command as unauthenticated and may reject the write command by making no changes to the characteristics 520 stored on the beacon 104.

Figure 8:
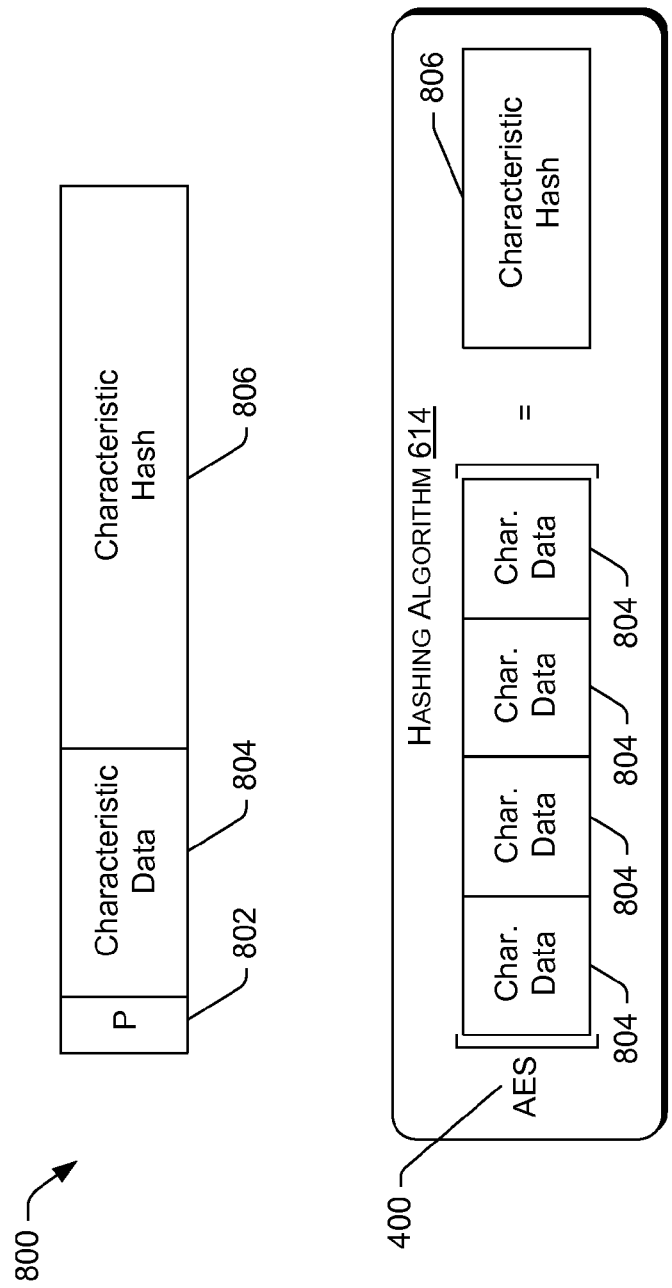
FIG. 8 illustrates an example structure of a "characteristic packet" and an example hashing algorithm that is used to generate a hash of a characteristic to be written to a beacon.

FIG. 8 illustrates an example characteristic packet structure 800 and an example hashing algorithm 614 that is used by the mobile device 102 to generate a hash of a characteristic 520 to be written to a beacon 104 when implementing the process 700 of FIG. 7. The characteristic packet structure 800 may include a pre-validation field 802 that may be used for a pre-verification process on a write command from any mobile device 102 to change a characteristic 520 of the beacon 104. In some embodiments, the pre-validation field 802 is a single byte value that can be checked by the beacon 104 upon receipt of the characteristic packet 800 as part of a write command to modify a characteristic 520.

The characteristic packet structure 800 may further include a characteristic data field 804 that contains the value of the characteristic 520 to be updated. For example, a new value for the transmission range 108 of the beacon 104 may be contained in the characteristic data field 804. The packet structure 800 may further include a hash of the characteristic 806 that is generated by the hashing algorithm 614 of the mobile device 102. An example of the hashing algorithm 614 used by the mobile device 102 to carry out step 702 of the process 700 is shown in FIG. 8. For example, the characteristic data 804 of the characteristic packet 800 may be repeated a predetermined number of times (e.g., four times), and encrypted using a cryptographic key (e.g., the AES key 400) to create/generate the characteristic hash 806 that is to be combined with the characteristic 520 to form the characteristic packet structure 800. The characteristic packet 800 may be transmitted by the mobile device 102 to the beacon 104 as part of a write command to modify a characteristic 520 on the beacon 104 in a secure manner according to the example process 700 of FIG. 7.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A wireless broadcasting device comprising:
   one or more processors;
   a transceiver;
   one or more memories storing a device identifier (ID) that uniquely identifies the wireless broadcasting device and computer-executable instructions that, when executed by the one or more processors, perform acts comprising:
   creating a first packet having: (i) a first ID and (ii) a randomly generated value;
   broadcasting, via the transceiver, the first packet;
   generating a second, different ID based at least in part on the randomly generated value included in the first packet;
   creating a second packet having: (i) the second ID and (ii) the device ID; and broadcasting, via the transceiver, the second packet,
wherein the first packet and the second packet are continuously re-broadcast for a period of time from broadcasting the first packet, the acts further comprising, upon expiration of the period of time:
generating a new randomly generated value;
broadcasting a third packet that includes the first ID and the new randomly generated value;
generating a third ID based at least in part on the new randomly generated value included in the third packet; and
broadcasting a fourth packet that includes the third ID and the device ID.

2. The wireless broadcasting device of claim 1, wherein the wireless broadcasting device comprises a Bluetooth Low Energy (BLE) beacon.

3. The wireless broadcasting device of claim 1, wherein the one or more memories further store a Pseudo Random Number Generator (PRNG) to generate the randomly generated value.

4. The wireless broadcasting device of claim 3, wherein the PRNG is further configured to, at multiple different times:
generate a random value for the device ID; and
assign the random value to the wireless broadcasting device as the device ID that is to be included in the second packet.

5. The wireless broadcasting device of claim 1, wherein the generating the second ID comprises using the randomly generated value as a seed for a hashing algorithm that is used to generate the second ID.

6. The wireless broadcasting device of claim 5, wherein the using the randomly generated value as a seed for the hashing algorithm comprises:
replicating the randomly generated value a predetermined number of times to obtain a value constituted of the replicated randomly generated value; and
encrypting the value with a cryptographic key to form the second ID.

7. A computer-implemented method to be performed by a wireless broadcasting device, the method comprising:
creating, by the wireless broadcasting device, a first packet having: (i) a first identifier (ID) and (ii) a randomly generated value;
broadcasting, by the wireless broadcasting device, the first packet;
generating, by the wireless broadcasting device, a second, different ID based at least in part on the randomly generated value included in the first packet;
creating, by the wireless broadcasting device, a second packet having: (i) the second ID and (ii) a device ID that uniquely identifies the wireless broadcasting device; and
broadcasting, by the wireless broadcasting device, the second packet,
wherein the first packet and the second packet are continuously broadcast for a period of time from the broadcasting of the first packet, the method further comprising, upon expiration of the period of time:
generating a new randomly generated value;
broadcasting a third packet that includes the first ID and the new randomly generated value;
generating a third ID based at least in part on the new randomly generated value included in the third packet; and
broadcasting a fourth packet that includes the third ID and the device ID.

8. The method of claim 7, wherein the device ID comprises a randomly generated device ID, the method further comprising, prior to broadcasting the second packet, assigning the randomly generated device ID to the wireless broadcasting device.

9. The method of claim 7, wherein the generating the second ID comprises using the randomly generated value as a seed for a hashing algorithm that is used to generate the second ID.

10. The method of claim 9, wherein the using the randomly generated value as a seed for the hashing algorithm comprises:
replicating the randomly generated value a predetermined number of times to obtain a value constituted of the replicated randomly generated value; and
encrypting the value with a cryptographic key to form the second ID.

11. The method of claim 7, wherein the generating the second ID comprises encrypting the randomly generated value with a symmetric key.

12. The method of claim 7, further comprising receiving a write command from a mobile device, the write command comprising a command to update a characteristic of the wireless broadcasting device.

13. The method of claim 12, further comprising authenticating the write command by:
extracting a characteristic from a message carrying the received write command;
calculating a hash of the characteristic using a hashing algorithm;
extracting a characteristic hash from the message;
comparing the calculated hash of the characteristic to the extracted characteristic hash;
authenticating the write command if the calculated hash of the characteristic matches the extracted characteristic hash; and
rejecting the write command if the calculated hash of the characteristic does not match the extracted characteristic hash.

14. The method of claim 12, further comprising:
parsing a pre-validation value associated with the write command;
comparing the pre-validation value to a predetermined value;
rejecting the write command if the pre-validation value does not equal the predetermined value; and
processing the write command if the pre-validation value equals the predetermined value.

15. A non-transitory computer-readable medium storing computer-executable instructions that, when executed by one or more processors of a wireless broadcasting device, perform acts comprising:
creating a first packet having: (i) a first identifier (ID) and (ii) a randomly generated value;
broadcasting, via a transceiver of the wireless broadcasting device, the first packet;
generating a second, different ID based at least in part on the randomly generated value included in the first packet;
creating a second packet having: (i) the second ID and (ii) a device ID that uniquely identifies the wireless broadcasting device; and
broadcasting, via the transceiver, the second packet,
wherein the first packet and the second packet are continuously re-broadcast for a period of time from broadcasting the first packet, the acts further comprising, upon expiration of the period of time:

generating a new randomly generated value;

broadcasting, via the transceiver, a third packet that includes the first ID and the new randomly generated value;

generating a third ID based at least in part on the new randomly generated value included in the third packet; and broadcasting, via the transceiver, a fourth packet that includes the third ID and the device ID.

16. The non-transitory computer-readable medium of claim 15, wherein the wireless broadcasting device comprises a Bluetooth Low Energy (BLE) beacon.

17. The non-transitory computer-readable medium of claim 15, further storing a Pseudo Random Number Generator (PRNG) to generate the randomly generated value.

18. The non-transitory computer-readable medium of claim 17, wherein the PRNG is further configured to, at multiple different times:

generate a random value for the device ID; and assign the random value to the wireless broadcasting device as the device ID that is to be included in the second packet.

19. The non-transitory computer-readable medium of claim 15, wherein the generating the second ID comprises using the randomly generated value as a seed for a hashing algorithm that is used to generate the second ID.

20. The non-transitory computer-readable medium of claim 19, wherein the using the randomly generated value as a seed for the hashing algorithm comprises:

replicating the randomly generated value a predetermined number of times to obtain a value constituted of the replicated randomly generated value; and encrypting the value with a cryptographic key to form the second ID.

* * * * *